(12) United States Patent
Aksu et al.

(10) Patent No.: US 11,197,228 B2
(45) Date of Patent: Dec. 7, 2021

(54) SYSTEMS AND METHODS FOR REFINING TOPOLOGY OF A DISTRIBUTED UNIT MESH IN A RADIO ACCESS NETWORK

(71) Applicant: Verizon Patent and Licensing Inc., Arlington, VA (US)

(72) Inventors: Arda Aksu, Martinez, CA (US); Lalit R. Kotecha, San Ramon, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

(21) Appl. No.: 16/688,087

(22) Filed: Nov. 19, 2019

(65) Prior Publication Data

US 2021/0153100 A1    May 20, 2021

(51) Int. Cl.
*H04W 40/24*   (2009.01)
*H04W 8/00*    (2009.01)
*H04L 12/26*   (2006.01)
*H04L 1/00*    (2006.01)
*H04W 84/18*   (2009.01)

(52) U.S. Cl.
CPC ......... *H04W 40/246* (2013.01); *H04L 1/0026* (2013.01); *H04L 43/0817* (2013.01); *H04W 8/005* (2013.01); *H04W 84/18* (2013.01)

(58) Field of Classification Search
CPC ..... H04L 1/0026; H04L 43/0817; H04L 1/00; H04L 43/08; H04L 43/0811; H04W 8/005; H04W 40/246; H04W 84/18; H04W 8/14; H04W 40/24; H04W 84/00
See application file for complete search history.

(56) References Cited

U.S. PATENT DOCUMENTS

| | | | |
|---|---|---|---|
| 9,717,110 B1* | 7/2017 | Gupta | H04W 36/03 |
| 10,588,069 B1* | 3/2020 | Chen | H04L 45/123 |
| 2003/0202476 A1* | 10/2003 | Billhartz | H04L 45/302 370/236 |
| 2009/0022122 A1* | 1/2009 | Quigley | H04W 40/246 370/338 |
| 2013/0064159 A1* | 3/2013 | Edwards | H04L 12/189 370/312 |
| 2020/0305062 A1* | 9/2020 | Kharvar | H04W 84/18 |

* cited by examiner

*Primary Examiner* — Michael Thier
*Assistant Examiner* — Prince A Mensah (57) ABSTRACT

A system described herein may provide a technique for the discovery and connection of Mesh Distributed Units ("MDUs"), which may establish a mesh topology and perform wireless backhaul of data between a core network and a User Equipment ("UE"). Multiple MDUs in an MDU network may be connected to establish an MDU route. One or more connected MDUs may broadcast an indication that the MDU is available to connect, one or more performance metrics, or an MDU performance score based on performance metrics. This broadcast may iteratively repeat in order to refine the mesh network topology in an ongoing process.

20 Claims, 9 Drawing Sheets

SYSTEMS AND METHODS FOR REFINING TOPOLOGY OF A DISTRIBUTED UNIT MESH IN A RADIO ACCESS NETWORK

BACKGROUND

Wireless telecommunication networks provide network connectivity to user equipment ("UE"), such as mobile telephones or other wireless communication devices, via a radio access network ("RAN"). A RAN may include multiple radios, which may be distributed geographically, through which UEs may connect.

DETAILED DESCRIPTION OF THE PREFERRED EMBODIMENTS

The following detailed description refers to the accompanying drawings. The same reference numbers in different drawings may identify the same or similar elements.

Embodiments described herein provide for connectivity to a wireless telecommunications network via different radios (e.g., radios that are distributed geographically, radios that operate at different frequency bands, radios that offer different coverage area sizes, radios connected to establish a backhaul, etc.). For instance, the wireless telecommunications network may include a mesh distributed unit ("MDU") network, in which multiple MDUs each provide differentiated wireless access to UEs (e.g., where different MDUs are located in different geographic regions, operate at different frequency bands, etc.). In some instances, a wireless MDU network may provide for scalable wireless transport of traffic from one portion of a RAN to another portion of the RAN and eventually to a core network (sometimes referred to as "wireless backhaul"). For instance, an MDU may receive traffic from a UE, and may route the traffic through one or more other MDUs to a Hub MDU ("HMDU"), Central Unit ("CU") and/or other device or system that provides the traffic to a core network.

As described herein, MDUs of an MDU network may broadcast information (e.g., a System Information Block ("SIB"), Master Information Block ("MIB"), and/or other suitable information) that can be used by other MDUs to discover the MDUs of the MDU network. In accordance with some embodiments, the MDUs may operate to establish or modify a topology of the MDU network (e.g., routes between MDUs). The broadcasted information may include, for example, presence information indicating availability for other MDUs to connect to the MDU, performance metrics indicating performance between the MDU and one or more other MDUs (such as a measure of latency between the MDU and one or more other MDUs, a measure of error rate of traffic between the MDU and one or more other MDUs, etc.), a network performance score (e.g., a score that is generated based on one or more performance metrics), etc. In accordance with some embodiments, a given MDU may select a particular MDU, of the MDU network, to connect to based on the broadcasted information from the particular MDU (and/or from other MDUs of the MDU network). As described below, an MDU may join an existing MDU network (e.g., may connect to an MDU of the MDU network) and/or may modify the topology of an existing MDU network (e.g., a first MDU, which is connected to a second MDU of the MDU network, may disconnect from the second MDU and may instead connect to a third MDU of the MDU network) using the techniques described herein. Such embodiments may result in allowing MDUs to continuing to refine pathways for wireless backhaul transmission of data among MDUs. The ongoing refinement of the MDU network may ensure optimal performance, enhancing user experience and reducing manual effort that would otherwise be expended in configuring or modifying the topology of an MDU network.

Figure 1:
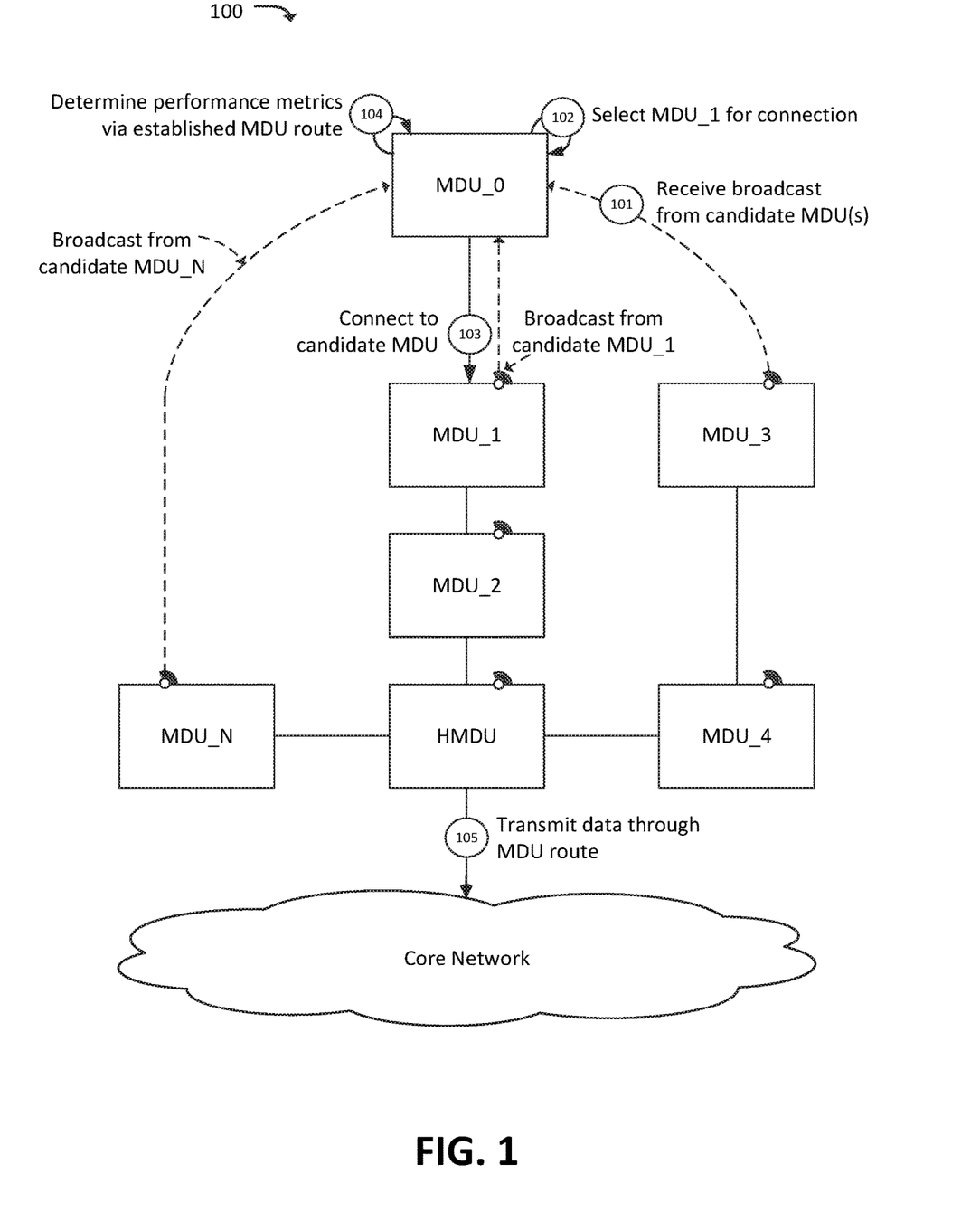
FIG. 1 illustrates an example overview of one or more embodiments described herein, in which a mesh distributed unit ("MDU") network may be utilized to facilitate wireless backhaul communications in a RAN of a wireless network.

As shown in FIG. 1, for instance, MDU_0 may receive (at 101) broadcasts from several MDUs of an MDU network 100 via a radio frequency ("RF") interface. For example, MDU_0 may be within wireless communication range of MDU_1, MDU_3, and MDU_N. As shown, MDU network 100 may include multiple MDUs, such as MDU_1 through MDU_N. MDU_0 may, in some scenarios, be a member of MDU network 100 (e.g., may already be connected to one of the MDUs of MDU network 100) and the topology of MDU network 100 may be adjusted in accordance with the example process described below. In other scenarios, MDU_0 may join MDU network 100 in accordance with the example process described below.

As depicted, one or more MDU routes may be established within an MDU network. As discussed herein, an "MDU route" may refer to a set of MDUs that are communicatively coupled, such that the MDUs form a sequential chain of MDUs from a given MDU to the HMDU. For example, within MDU network 100, MDU_1, MDU_2, and the HMDU establish one MDU route while MDU_3, MDU_4, and the HMDU establish a second MDU route. In this figure, MDU routes are depicted by solid lines connecting MDUs and the HMDU.

As denoted by the lined broadcast indicators in the figure, the MDUs may broadcast information that indicates availability to join the MDU network (e.g., by connecting to one or more of the broadcasting MDUs). For instance, an MDU broadcast may indicate the availability for the MDU to connect, one or more load metrics (e.g., available bandwidth, available quantity of connections, and/or some other measure of load and/or capacity, etc.), an MDU route performance score based on one or more performance metrics (e.g., as described in greater detail below), and/or any other suitable information.

As shown, MDU_0 may select (at 102) to connect to MDU_1, out of the candidate set of MDU_1, MDU_3, and MDU_N (i.e., the MDUs from which MDU_1 received (at 101) broadcasted information). In some embodiments, MDU_0 may use some or all of the received broadcast information (e.g., MDU route performance score, load metrics, etc.) to determine which candidate MDU to select for connection. In some embodiments, MDU_0 may use other performance metrics not necessarily received via broadcast (e.g., Received Signal Strength Indicator ("RSSI") between MDU_0 and a candidate MDU, Signal-to-Interference-and-Noise-Ratio ("SINR"), and/or other determinable performance metrics) to select an MDU for connection.

As further shown, MDU_0 may connect (at 103) to the selected candidate MDU (i.e., MDU_1 in this example, which may be a part of an MDU route that includes MDU_1, MDU_2, and the HMDU). Once connected, MDU_0 may determine (at 104) performance metrics of the newly established MDU route that includes MDU_0 (i.e., MDU_0, MDU_1, MDU_2, and the HMDU). Generally, these performance metrics may indicate the ability of the established route to perform wireless backhaul functions (e.g., to transport data between a UE and a core network).

In some embodiments, the determination of performance metrics may include evaluating throughput, latency, error rate, jitter, and/or other performance metrics of traffic sent and/or received by MDU_0, via the established MDU route. For example, MDU_0 may evaluate performance metrics of uplink and/or downlink traffic sent to and/or from the core network, in order to determine performance metrics of the established MDU route. Additionally, or alternatively, MDU_0 may communicate (e.g., via an X2 interface) with some or all of the MDUs in the MDU route (e.g., MDU_1, MDU_2, and/or the HMDU) to evaluate performance metrics between MDU_0 and one or more individual MDUs in the MDU route. If the performance of the MDU route is acceptable (e.g., the performance metrics, and/or some other measure of performance, exceed a threshold measure of performance; and/or if the performance metrics indicate that the MDU route is the best performing MDU route out of a set of possible routes), then the MDU route may proceed to carry (at 105) data between MDU_0 and the core network. As described below, if the performance metrics are not acceptable (e.g., do not satisfy or exceed a threshold measure of performance), then MDU_0 may attempt to establish a better performing MDU route (e.g., via MDU_3 and/or MDU_N).

MDU_0 may broadcast its availability for other MDUs to attach to MDU_0, in order to join MDU network 100. In some embodiments, MDU_0 may also broadcast performance-related information, which may be based on the performance metrics (determined at 104) associated with MDU_0. For example, MDU_0 may generate one or more scores that are based on the determined performance metrics (e.g., one score that indicates uplink throughput, a score that indicates downlink throughput, another score that indicates uplink jitter, and so on), and/or may generate an aggregate score that is based on multiple performance metrics (e.g., a score on a scale of 1-16, 1-32, 1-64, and/or any other suitable score, which may be indicated by a set of bits in a MIB, a SIB, and/or some other suitable broadcasted information).

In some embodiments, topology of the MDU network may be refined in an ongoing process. For example, based on the information broadcasted by MDUs of an MDU network, some or all of the MDUs may disconnect from a presently connected MDU and attach to a different MDU (e.g., a different MDU which may potentially provide better performance or connection robustness). FIGS. 2A-D illustrate an example of refining an MDU network topology based on performance metrics.

Figure 2A:
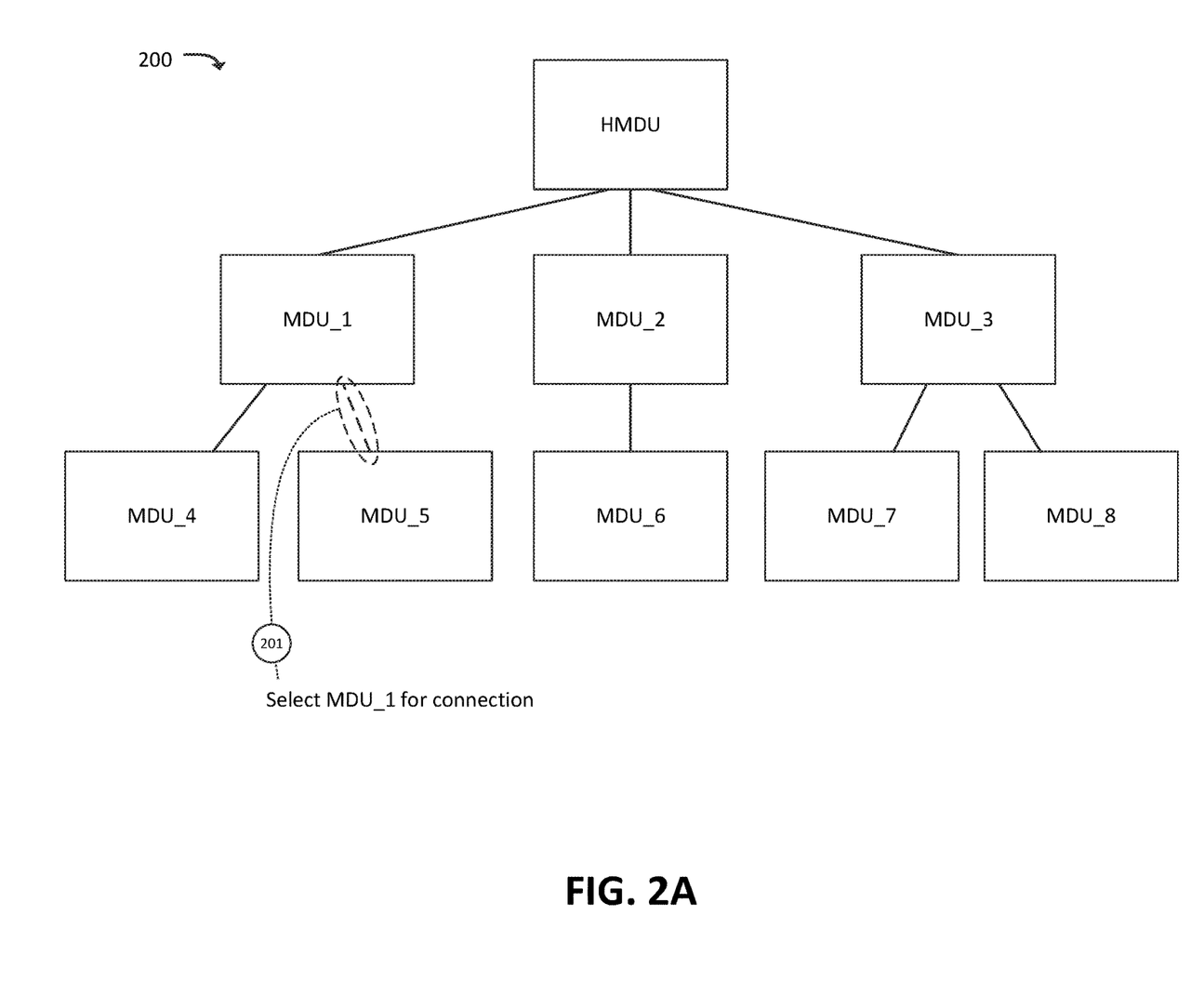
FIGS. 2A-2D illustrate an example overview of one or more embodiments described herein, in which an MDU route may be modified based on performance metrics.

For example, as shown in FIG. 2A, a particular MDU of MDU network 200 (i.e., MDU_5 in this example) MDU_5 may select (at 201) to attach to MDU_1, resulting in an MDU route that includes MDU_1 and the HMDU. MDU_5 may select a connection to MDU_1 based on information broadcasted by MDU_1 (e.g., as similarly described above).

As shown, multiple MDU routes may exist in MDU network 200 (as depicted here by the solid lines between MDUs and the HMDU). As additionally illustrated in FIG. 2A, multiple MDUs may attach to a given MDU. For example, MDU_7 and MDU_8 may both be connected to MDU_3, resulting in two MDU routes: (1) MDU_7, MDU_3, and the HMDU, and (2) MDU_8, MDU_3, and the HMDU.

Figure 2B:
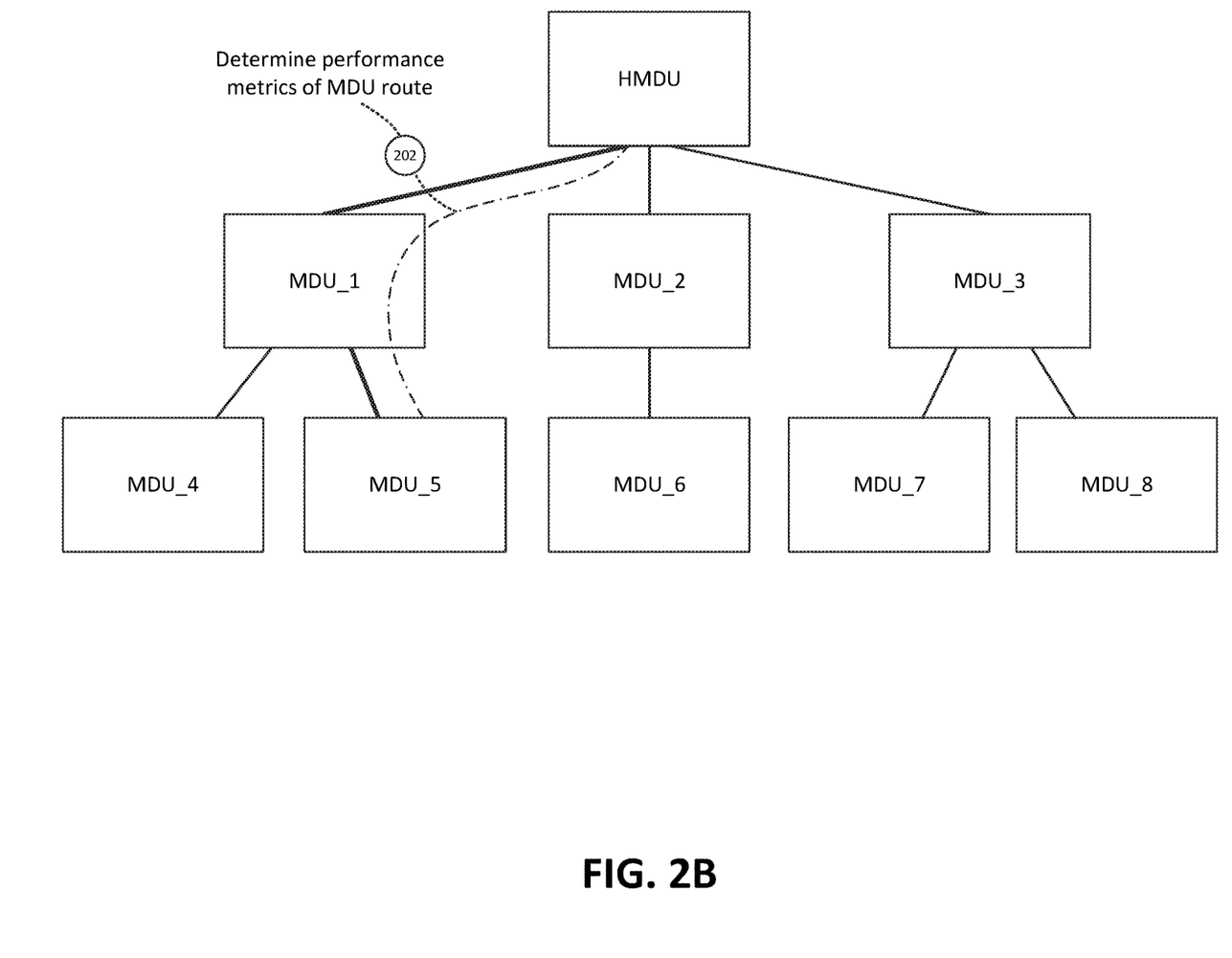

As shown in FIG. 2B, MDU_5 may determine (at 202) the performance of the MDU route (e.g., in a manner similarly described above). This determination may include determining additional performance metrics transmitted during the connection of MDU_5 to MDU_1, which may indicate and/or may be based on, performance of traffic sent and/or received between MDU_5 and the HMDU (i.e., via MDU_1, in this example).

Figure 2C:
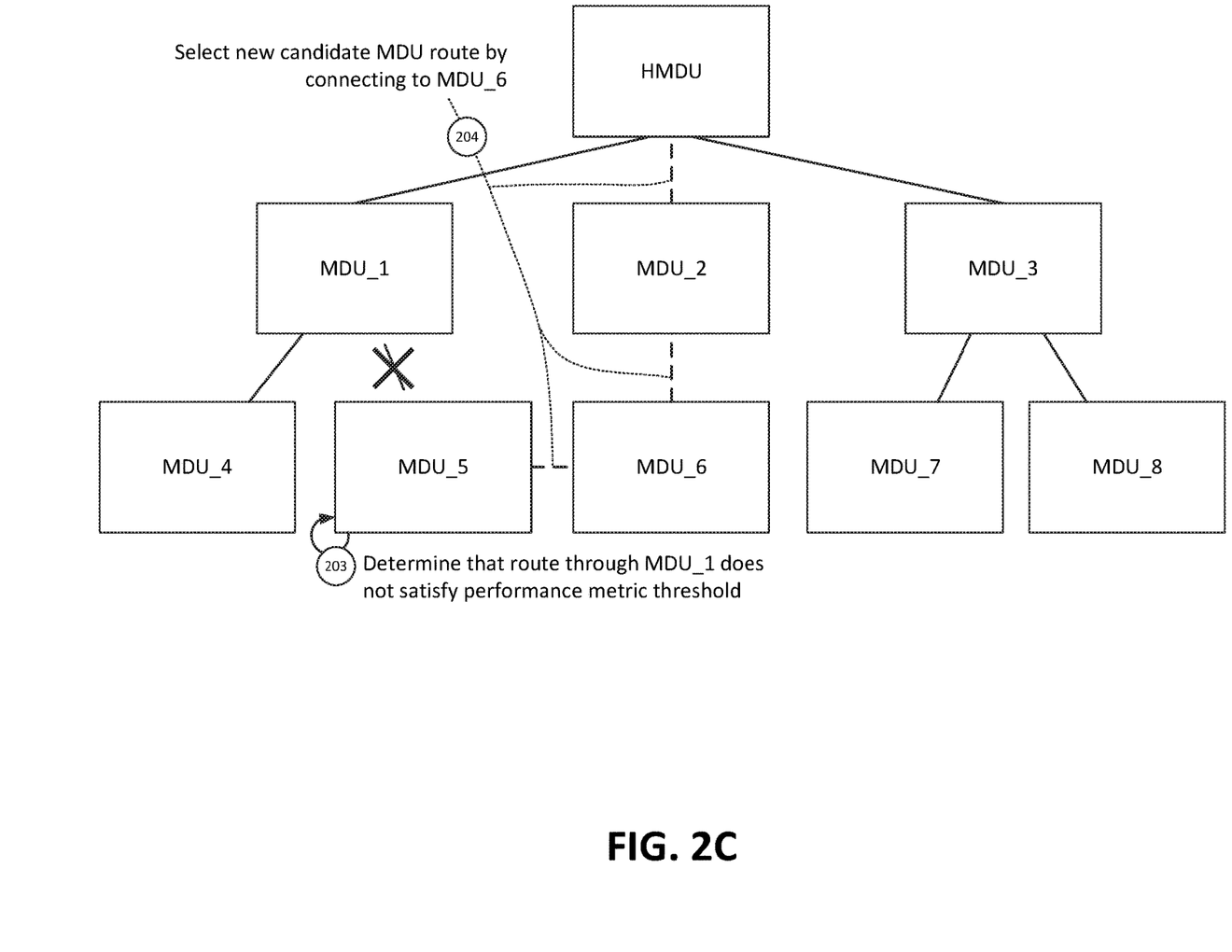

Further, as depicted in FIG. 2C, MDU_5 may determine (at 203) that a measure of the performance associated with the MDU route (i.e., via MDU_1) do not satisfy a performance metric threshold. Based on determining that the MDU route does not satisfy the threshold performance, MDU_1 may attempt to connect to an alternative MDU (e.g., establish a different MDU route). For example, MDU_5 may connect (at 204) to MDU_6 (e.g., in a manner similar to that described above, including identifying broadcast information from MDU_6), and/or by determining connection metrics between MDU_5 and MDU_6 (e.g., RSSI, SINR, and/or other connection metrics). While not displayed here, an MDU may receive broadcasts from MDUs of a different MDU network (e.g., containing one or more MDUs or HMDUs) and connect to an MDU route in that MDU network. The connection of MDU_5 to MDU_6 may result in an MDU route that includes MDU_5, MDU_6, MDU_2, and the HMDU (as indicated in the figure by the dashed lines between these MDUs).

Connecting to MDU_6 may also include disconnecting from MDU_5 (as indicated in the figure by the "X" in between MDU_1 and MDU_5). In some embodiments, MDU_5 may store information that indicates that performance metrics associated with the connection between MDU_5 and MDU_1 did not satisfy the performance threshold. MDU_5 may use this information in the future when determining whether to connect to MDU_1 (e.g., MDU_1 may be deprioritized, compared to other MDUs, based on the information indicating that the performance metrics associated with the connection between MDU_5 and MDU_1).

Figure 2D:
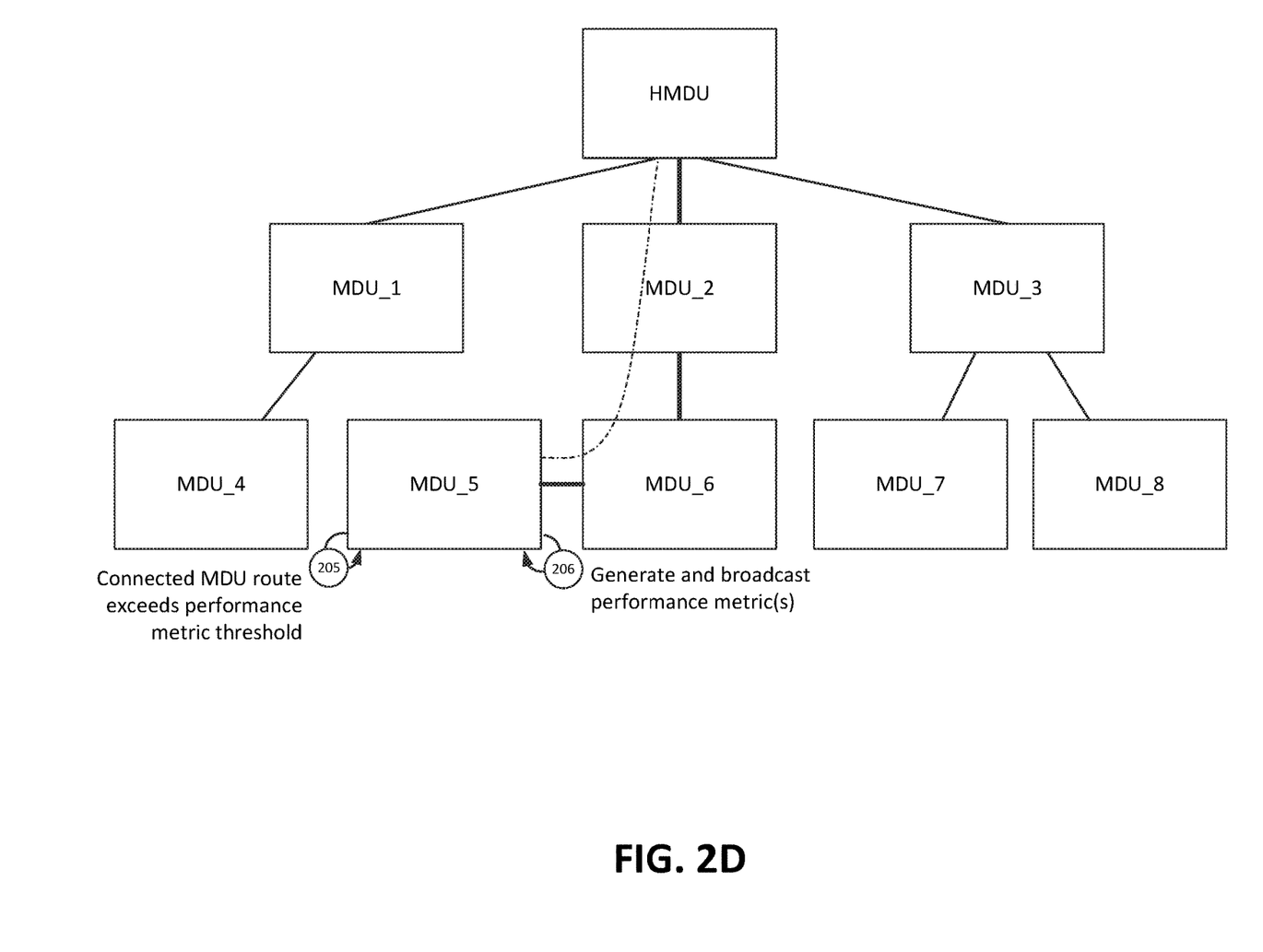

As shown in FIG. 2D, once MDU_5 connects to MDU_6 (resulting in the new MDU route through MDU_6 and MDU_2 to the HMDU), MDU_5 may connect to MDU_6 (as depicted in the figure by the bold solid lines between these MDUs). Once connected, MDU_5 may determine (at 205) whether the MDU route exceeds performance metrics thresholds. As discussed above, the determination may include an analysis of performance metrics relating to the capacity of the MDU route to transmit data between MDU_5 and one or more other devices, networks, or systems (e.g., between MDU_5 and the HMDU, between MDU_5 and a core network to which the HMDU is connected, etc.). As depicted here, MDU_5 has determined that the new MDU route exceeds the performance metric threshold.

In some embodiments, the HMDU may store information indicating that MDU_5 has connected to MDU_6 and may store information indicating that MDU_5 has disconnected from MDU_1 (and/or may delete information indicating that MDU_5 is connected to MDU_1). In this manner, the HMDU may maintain a routing table and/or other information indicating the various MDU routes with which the HMDU is associated. In some embodiments, the HMDU may provide some or all of the routing table to the MDUs of the MDU network, and/or may provide information derived from the routing table to the MDUs of the MDU network. For example, when the HMDU detects that MDU_5 has connected to MDU_6, the HMDU may provide information indicating the MDU route to MDU_5, may provide a numerical value indicating a quantity of MDUs in the MDU route (e.g., 3 in this example, indicating 3 "hops" in the route including a first hop from MDU_5 to MDU_6, a second hop from MDU_6 to MDU_2, and a third hop from MDU_2 to the HMDU).

Furthermore, as depicted, MDU_5 may generate and broadcast (at 206) performance metrics for the MDU route consisting of MDU_5, MDU_6, MDU_2, and the HMDU. In some instances, MDU_5 may broadcast the availability of MDU_5 route to be connected to by another device (e.g., a UE or another MDU), a quantity of hops associated with the MDU route, or a score based on performance metrics relating to the ability for the MDU route, of which MDU_5 is a part, to transmit traffic (e.g., based on the performance metrics of the MDU route (as determined at 205)).

Figure 3:
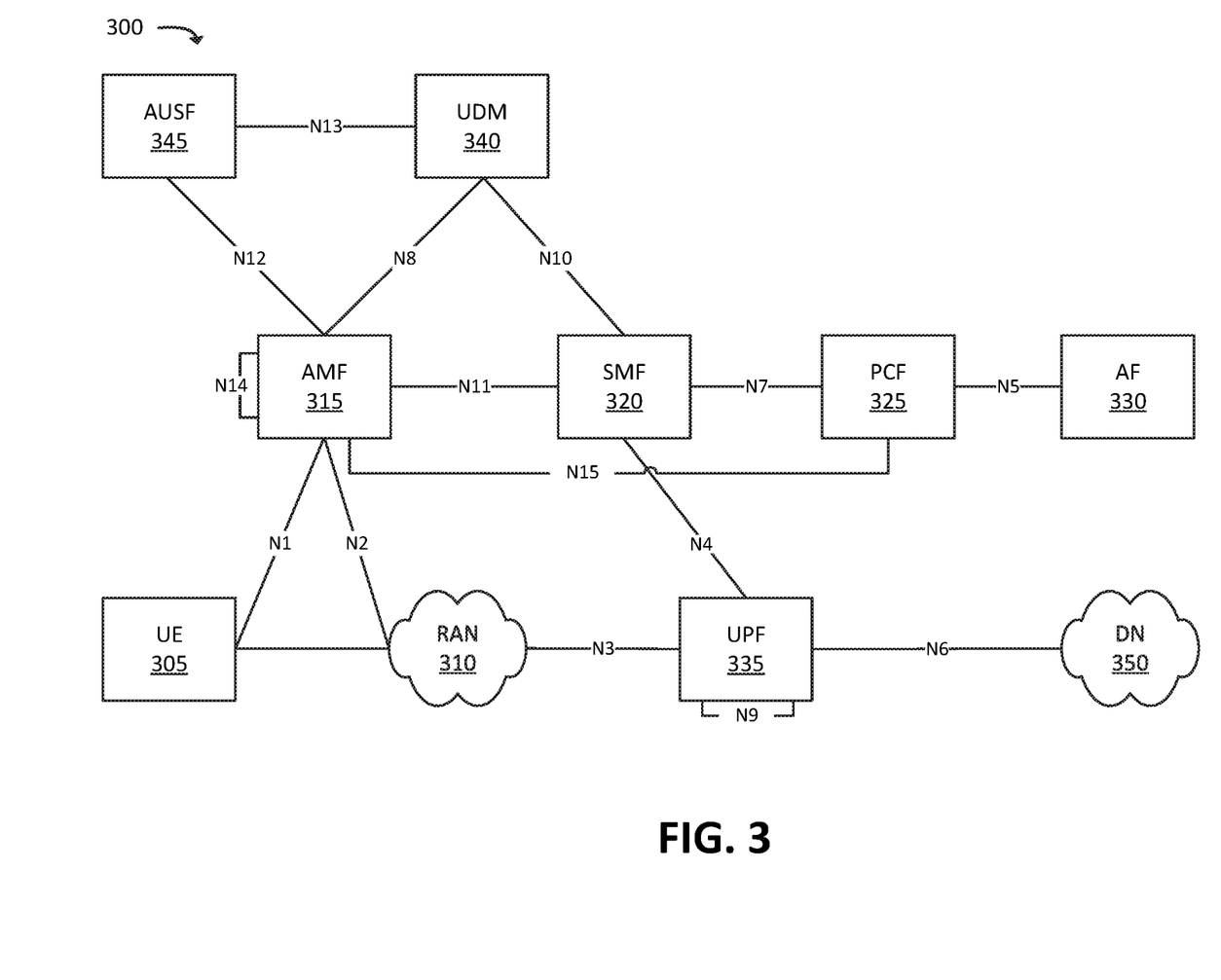
FIG. 3 illustrates an example environment in which one or more embodiments, described herein, may be implemented.

FIG. 3 illustrates an example environment 300 in which one or more embodiments may be implemented. In some embodiments, environment 300 may correspond to a Fifth Generation ("5G") network, and/or may include elements of a 5G network. As shown, environment 300 may include UE 305, RAN 310, Access and Mobility Management Function ("AMF") 315, Session Management Function ("SMF") 320, Policy Control Function ("PCF") 325, Application Function ("AF") 330, User Plane Function ("UPF") 335, Unified Data Management ("UDM") 340, Authentication Server Function ("AUSF") 345, and Data Network ("DN") 350.

The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environment 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 305 may include a computation and communication device, such as a wireless mobile communication device that is capable of communicating with RAN 310 and/or DN 350. UE 305 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 305 may send traffic to and/or receive traffic (e.g., user plane traffic) from DN 350 via RAN 310 and UPF 335.

RAN 310 may be, or may include, a 5G RAN that includes one or more base stations (e.g., one or more Next Generation Node Bs ("gNBs")), which UE 305 may communicate with one or more other elements of environment 300. UE 305 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, AMF 315, and/or one or more other devices or networks) and may communicate the traffic to UE 305 via the air interface.

Figure 4:
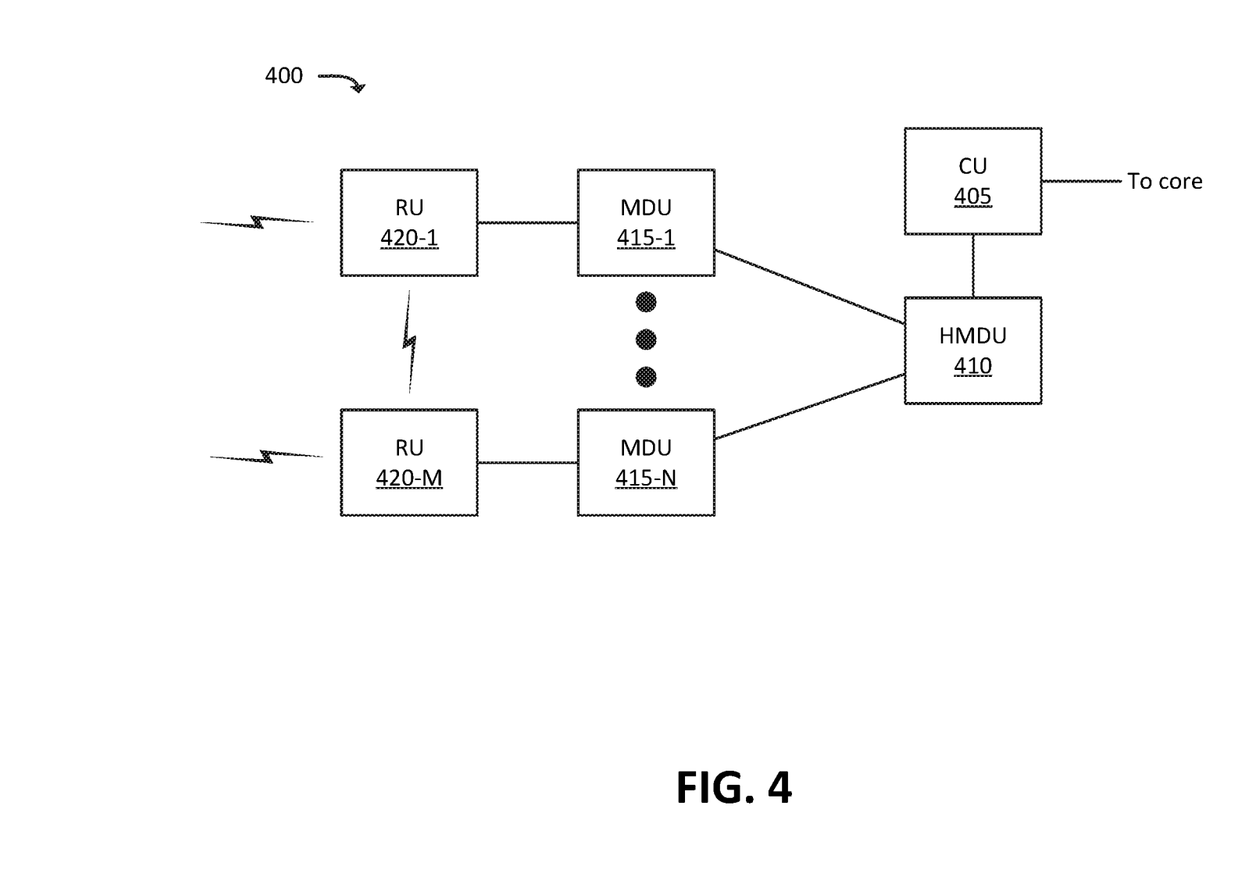
FIG. 4 illustrates an example arrangement of components of a RAN, in accordance with some embodiments described herein.

In some embodiments, RAN 310 may include an MDU network, in which one or more base stations are implemented by a distributed set of devices or systems (e.g., multiple MDUs) that are able to wirelessly communicate with each other and/or with UE 305. FIG. 4, discussed below, illustrates an example arrangement of an MDU network 400 within RAN 310.

AMF 315 may include one or more devices, systems, Virtualized Network Functions ("VNFs"), etc., that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the N14 interface (denoted in FIG. 3 by the line marked "N14" originating and terminating at AMF 515).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices, systems, VNFs, etc., that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices, systems, VNFs, etc., that receive, store, and/or provide information that may be used in determining parameters (e.g., quality of service parameters, charging parameters, or the like) for certain applications.

UPF 335 may include one or more devices, systems, VNFs, etc., that receive, store, and/or provide data (e.g., user plane data). For example, UPF 335 may receive user plane data (e.g., voice call traffic, data traffic, etc.), destined for UE 305, from DN 350, and may forward the user plane data toward UE 305 (e.g., via RAN 310, SMF 320, and/or one or more other devices). In some embodiments, multiple UPFs 335 may be deployed (e.g., in different geographical locations), and the delivery of content to UE 305 may be coordinated via the N9 interface (e.g., as denoted in FIG. 3 by the line marked "N9" originating and terminating at UPF 335). Similarly, UPF 335 may receive traffic from UE 305 (e.g., via RAN 310, SMF 320, and/or one or more other devices), and may forward the traffic toward DN 350. In some embodiments, UPF 335 may communicate (e.g., via the N4 interface) with SMF 320, regarding user plane data processed by UPF 335.

AUSF 345 and UDM 340 may include one or more devices, systems, VNFs, etc., that manage, update, and/or store, in one or more memory devices associated with AUSF 345 and/or UDM 340, profile information associated with a subscriber. AUSF 345 and/or UDM 340 may perform authentication, authorization, and/or accounting operations associated with the subscriber and/or a communication session with UE 305.

DN 350 may include one or more wired and/or wireless networks. For example, DN 350 may include an Internet Protocol ("IP")-based PDN, a wide area network ("WAN") such as the Internet, a private enterprise network, and/or one or more other networks. UE 305 may communicate, through DN 350, with data servers, other UEs 305, and/or to other servers or applications that are coupled to DN 350. DN 350 may be connected to one or more other networks, such as a public switched telephone network ("PSTN"), a public land mobile network ("PLMN"), and/or another network. DN 350 may be connected to one or more devices, such as content providers, applications, web servers, and/or other devices, with which UE 305 may communicate.

FIG. 4 illustrates an example MDU network 400, which may be included in and/or implemented by RAN 310, and/or may depict example components of RAN 310. In some embodiments, RAN 310 may include one MDU network 400. In some embodiments, RAN 310 may include multiple MDU networks 400. As shown, MDU network 400 may include CU 405, HMDU 410, one or more MDUs 415-1 through 415-N (referred to individually as "MDU 415," or collectively as "MDUs 415"), and one or more Remote Units ("RUs") 420-1 through 420-M (referred to individually as "RU 420," or collectively as "RUs 420").

CU 405 may communicate with a core of a wireless network (e.g., may communicate with one or more of the devices or systems described with respect to FIG. 3, such as AMF 315 and/or UPF 335). In the uplink direction (e.g., for traffic from UEs 305 to a core network), CU 405 may aggregate traffic from MDUs 415 (e.g., via HMDU 410), and forward the aggregated traffic to a core network. In some embodiments, CU 405 may receive traffic according to a given protocol (e.g., Radio Link Control ("RLC")) from MDUs 415, and may perform higher-layer processing (e.g., may aggregate/process RLC packets and generate Packet Data Convergence Protocol ("PDCP") packets based on the RLC packets) on the traffic received from MDUs 415.

In accordance with some embodiments, CU 405 may forward downlink traffic (e.g., traffic from the core network to a particular UE 305) to HMDU 410, which may determine which MDU(s) 415 should receive the downlink traffic. As similarly described above, HMDU 410 may determine which MDU(s) 415 to which to provide the traffic. For example, HMDU 410 may maintain information (e.g., a routing table and/or other suitable information) that indicates the MDU routes associated with MDUs 415, to which HMDU 410 is communicatively coupled (either directly or indirectly). For instance, when a first MDU 415 attaches to a second MDU 415, HMDU 410 may receive an indication from the first MDU 415 and/or the second MDU 415 (e.g., via Non-Access Stratum ("NAS") signaling and/or some other suitable signaling) that the first MDU 415 has attached to the second MDU 415.

In some embodiments, CU 405 and HMDU 410 may be implemented by the same device and/or system (e.g., a device or system that performs some or all of the functionality described above with respect to CU 405 and HMDU 410). In some embodiments, CU 405 and HMDU 410 may each be implemented by distinct devices and/or systems, which are in communication with each other in order to facilitate the functionality described above. While not explicitly illustrated in FIG. 4, HMDU 410 may be communicatively coupled to the core network (e.g., in addition to, or in lieu of, CU 405 being communicatively coupled to the core network).

MDU 415 may include one or more devices that transmit traffic between a core network (e.g., via CU 405 and/or HMDU 410) and UE 305 (e.g., via a respective RU 420). MDU 415 may, for example, receive traffic from RU 420 at a first layer (e.g., physical ("PHY") layer traffic, or lower PHY layer traffic), and may process/aggregate the traffic to a second layer (e.g., upper PHY and/or RLC). MDU 415 may receive traffic from CU 405 and/or HMDU 410 at the second layer, may process the traffic to the first layer, and provide the processed traffic to a respective RU 420 for transmission to UE 305.

As described in some embodiments, MDU 415 may be part of an MDU route that includes other MDUs 415 and HMDU 410. in some embodiments, MDU 415 may be, implement, or include, an Integrated Access Backhaul ("TAB") node. In some embodiments, HMDU 410 may be implemented by a same type of device or system that implements, or is capable of implementing, MDU 415.

RU 420 may include hardware circuitry (e.g., one or more RF transceivers, antennas, radios, and/or other suitable hardware) to communicate wirelessly (e.g., via an RF interface) with one or more UEs 305, one or more other MDUs 415 (e.g., via RUs 420 associated with MDUs 415), and/or any other suitable type of device. In the uplink direction, RU 420 may receive traffic from UE 305 and/or another MDU 415 via the RF interface and may provide the traffic to MDU 415 and/or MDU 415, as appropriate. In the downlink direction, RU 420 may receive traffic from HMDU 410 (e.g., via MDU 415 and/or directly from HMDU 410) and may provide the traffic to UE 305 and/or another MDU 415.

In some embodiments, one or more MDUs 415 may be configured as an HMDU 410 (e.g., where the configuration causes the configured MDU 415/HMDU 410 to maintain routing information, as discussed above). In such scenarios, a first MDU 415 may, via a first RU 420, attach to a second MDU 415 via a second RU 420. As discussed above, when configured as MDUs, MDUs 415 may perform wireless backhaul functionality (e.g., transporting traffic received from CU 405 or HMDU 410 to UE 305, and/or vice versa). In some such embodiments, HMDU 410 may receive wireless backhaul traffic from MDUs 415, aggregate and process the traffic, and provide the aggregated backhaul traffic to the core network. Similarly, HMDU 410 may receive traffic from a core network, which is destined for a particular MDU 415 (e.g., via CU 405), and may forward the traffic to the particular MDU 415 (e.g., via one or more other MDUs 415).

Figure 5:
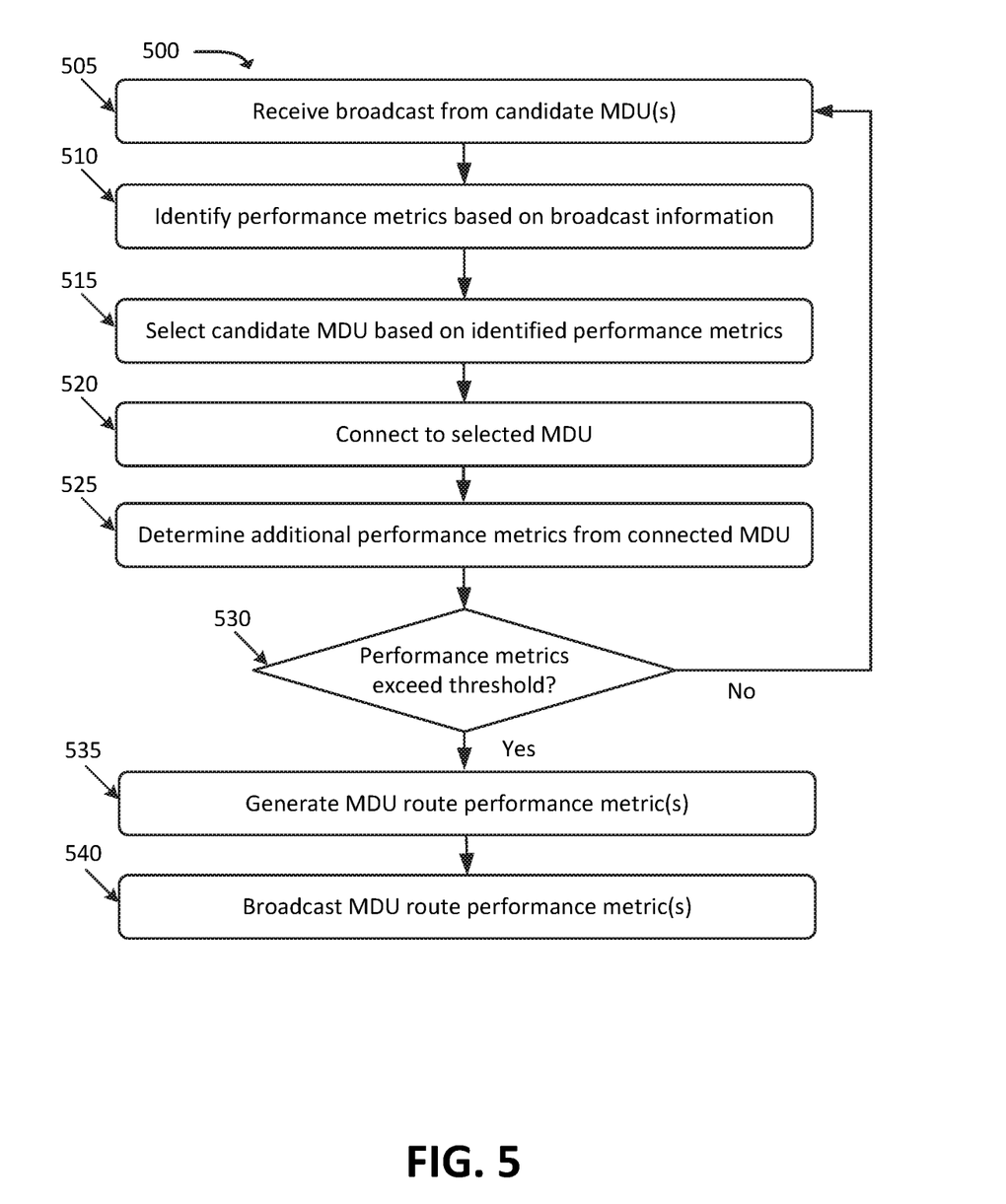
FIG. 5 illustrates an example process for the selection and/or refinement of one or more MDU routes in an MDU network.

FIG. 5 illustrates an example process 500 for the selection and/or refinement of one or more MDU routes in an MDU network. In some embodiments, some or all of process 500 may be performed by MDU 415 and/or one or more suitable devices. In some embodiments, process 500 may be performed in an ongoing and/or iterative manner in order to generate or refine an MDU network topology.

As shown, process 500 may include receiving (at 505) a broadcast from candidate MDUs 415. As discussed above, one or more candidate MDUs 415 may broadcast one or more performance metrics (e.g., available bandwidth, number of connected MDUs 415 (e.g., the number of "hops" between a given MDU 415 and HMDU 410), number of UEs 305 connected to a particular MDU 415, amount of RF spectrum allocated and/or available (e.g., "capacity") for backhaul functionality, etc.), a score based on performance metrics, or an indication regarding the availability to connect to the candidate MDU 415. In some embodiments, the broadcasted information may provide information regarding an established MDU route. For instance, MDU 415 may receive a broadcast from a candidate MDU 415 indicating a score based on the performance metrics of an MDU route associated with the candidate MDU 415. As mentioned above, the information may be broadcasted as part of a SIB, a MIB, and/or some other suitable broadcast information.

As further shown, process 500 may include identifying (at 510) performance metrics based on the received broadcast information. For example, MDU 415 may identify one or more of the performance metrics, associated with each MDU 415 of multiple MDUs 415 from which the broadcast information was received.

As further shown, process 500 may include selecting (at 515) a candidate MDU based on identified performance metrics. As discussed above, for example, MDU 415 based on the identified performance metrics (e.g., from multiple candidate MDUs 415), MDU 415 may select a candidate MDU 415. In some embodiments, MDU 415 may select a candidate MDU 415 based on determined criteria, such as signal strength between the connecting MDU 415 and candidate MDU 415. In some embodiments, the MDU 415 may select a candidate MDU 415 which exceeds an established performance threshold. In such embodiments, the MDU 415 may connect to a candidate MDU 415 which most exceeds the established performance threshold (e.g., in comparison to other candidate MDUs 415), may connect to the first identified MDU 415 whose performance metrics exceed the performance threshold, and/or may otherwise select a suitable candidate MDU 415 to connect to.

As further shown, process 500 may include connecting (at 520) to the selected MDU 415. As discussed above, this connection may establish the connecting MDU 415 as a member of an MDU route. As also discussed above, MDU 415 may notify HMDU 410 of the connection, based on which HMDU 410 may update a routing table to indicate the joining of MDU 415 to the MDU route. In some embodiments, the connecting MDU 415 may include an indication of the particular MDU 415, to which the joining MDU 415 has connected, in NAS signaling and/or other signaling. In some embodiments, this signaling may not be specifically addressed to HMDU 410 but may otherwise be visible or readable by HMDU 410. In this manner, the connecting MDU 415 need not be "aware" of HMDU 410, inasmuch as MDU 415 may not need to specifically provide an address or indicator of HMDU 410 in order for HMDU 410 to determine that MDU 415 has joined the MDU route.

As shown, process 500 may additionally include determining (at 525) additional performance metrics from the connected MDU 415. As discussed above, in some embodiments, candidate MDUs 415 may not broadcast all performance metrics (e.g., RSSI, SINR, etc. between candidate MDU 415 and one or more other MDUs 415). For example, upon connection, the connecting MDU 415 may send and/or receive network traffic (e.g., to and/or from a core network) and determine performance metrics, such as latency, throughput, jitter, etc.

As further shown, process 500 may include a determination (at 530) of whether the performance metrics of the MDU route exceed the threshold. In instances where the threshold is not exceeded (e.g., at 530—NO), process 500 may return to block 505. For instance, if MDU 415 determines that the connected MDU route fails to exceed the performance threshold(s), MDU 415 may receive broadcast(s) (e.g., at 505) from candidate MDUs 415, identify performance metrics (e.g., at 510), select candidate MDU 415 based on identified performance metrics (e.g., at 515), connect to the selected MDU 415 (e.g., at 520), and/or determine additional performance metrics from the selected MDU 415 (e.g., at 525).

In instances where established performance threshold(s) are exceeded (e.g., at 530—YES) process 500 may include generating (at 535) MDU route performance metrics(s). MDU route performance metrics may generally reflect the performance of the established MDU route. In some embodiments, MDU 415 may generate a performance score (e.g., a numerical score, a tier ranking such as "best" or "mediocre" tier, etc.) based on the determined performance metrics associated with the MDU route.

As further shown, process 500 may include broadcasting (at 540) the MDU route performance metric(s). The broadcast may include one or more of the generated network performance metrics (e.g., as generated at 535). In some embodiments, MDUs 415 may periodically or intermittently broadcast the performance metrics, a score based on performance metrics, etc. In this manner, MDUs 415 may continue to receive broadcasted information from other MDUs 415, and may modify the MDU network topology (e.g., by disconnecting from a presently connected MDU 415, in favor of connecting to an MDU 415 that is associated with better performance metrics). That is, some or all of process may be performed by an MDU 415 that is already part of an established MDU route.

Figure 6:
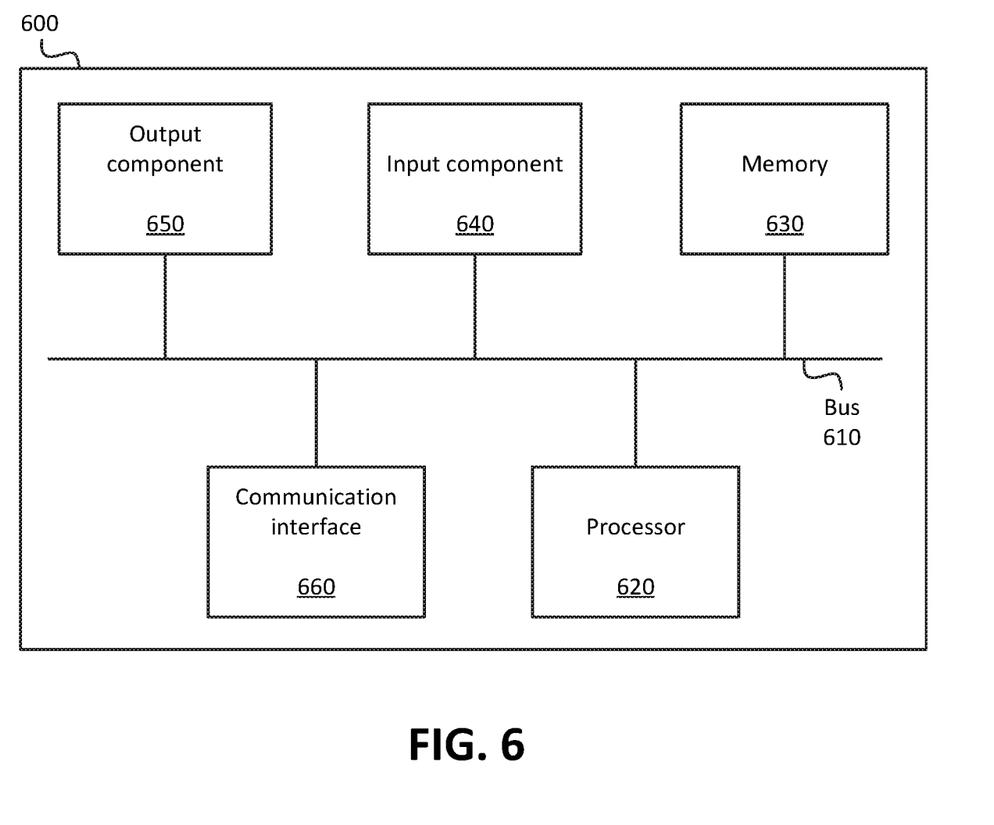
FIG. 6 illustrates example functional components of one or more devices, in accordance with one or more embodiments described herein.

FIG. 6 illustrates example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1, 2A-D, and 5, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a wireless transceiver; and
    one or more processors configured to:
        receive, from a first plurality of mesh distributed units ("MDUs"), via the wireless transceiver, broadcasted information;
        select a first MDU, out of the first plurality of MDUs, based on the received broadcasted information;
        connect, via the wireless transceiver, to the first MDU;
        subsequent to connecting to the first MDU:
            receive traffic to be sent to a core of a wireless network,
            provide the traffic to the first MDU via the wireless transceiver, wherein the first MDU forwards the traffic to the core of the wireless network, and
            determine a set of performance metrics associated with a route that includes the device and the first MDU;
        determine that the set of performance metrics, associated with the route that includes the device and the first MDU, does not satisfy a threshold measure of performance; and
        based on determining that the set of performance metrics does not satisfy the threshold measure of performance:
            cause the device to disconnect from the first MDU,
            receive broadcasted information from a second plurality of MDUs,
            select a second MDU, out of the second plurality of MDUs, based on the received information broadcasted by the second plurality of MDUs, and
            connect to the second MDU.

2. The device of claim 1, wherein the one or more processors are further configured to:
    identify a set of candidate MDUs out of the second plurality of MDUs; and
    exclude the first MDU from the set of candidate MDUs based on determining that the set of performance metrics, associated with the route that includes the device and the first MDU, does not satisfy the threshold measure of performance.

3. The device of claim 1, wherein the one or more processors are further configured to:
  output information indicating that the device has connected to the first MDU, wherein a second device receives the information indicating that the device has connected to the first MDU and determines, based on the received information, routing information regarding a route that includes the device and the first MDU.

4. The device of claim 3, wherein the second device includes a third MDU that is communicatively coupled to the first MDU and the core of the wireless network.

5. The device of claim 1, wherein the one or more processors are further configured to:
  broadcast information regarding the set of performance metrics, wherein one or more MDUs:
    receive the broadcasted information from the device, and
    determine whether to connect to the device based on the broadcasted information regarding the set of performance metrics.

6. The device of claim 5, wherein one or more processors are further configured to:
  generate, based on the set of performance metrics, a performance score, wherein broadcasting the information regarding the set of performance metrics further includes broadcasting the generated performance score.

7. The device of claim 1, wherein when selecting the first MDU, the one or more processors are further configured to:
  determine one or more performance metrics between the device and each MDU, of the first plurality of MDUs, wherein selecting the first MDU out of the first plurality of MDUs is further based on the determined one or more performance metrics.

8. The device of claim 1, wherein receiving the traffic to be sent to the core of the wireless network includes receiving the traffic, via the wireless transceiver, from a User Equipment ("UE").

9. A method, comprising:
  receiving, from a first plurality of mesh distributed units ("MDUs"), via a wireless transceiver associated with a device, broadcasted information;
  selecting, by the device, a first MDU, out of the plurality of MDUs, based on the received broadcasted information;
  connecting, via the wireless transceiver associated with the device, to the first MDU;
  subsequent to connecting to the first MDU:
    receiving traffic to be sent to a core of a wireless network,
    providing the traffic to the first MDU via the wireless transceiver, wherein the first MDU forwards the traffic to the core of the wireless network, and
    determining a set of performance metrics associated with a route that includes the device and the first MDU;
    determining that the set of performance metrics, associated with the route that includes the device and the first MDU, does not satisfy a threshold measure of performance; and
    based on determining that the set of performance metrics does not satisfy the threshold measure of performance:
      causing the device to disconnect from the first MDU,
      receiving broadcasted information from a second plurality of MDUs,
      selecting a second MDU, out of the second plurality of MDUs, based on the received information broadcasted by the second plurality of MDUs, and
      connecting to the second MDU.

10. The method of claim 9, further comprising:
  identifying a set of candidate MDUs out of the second plurality of MDUs; and
  excluding the first MDU from the set of candidate MDUs based on determining that the set of performance metrics, associated with the route that includes the device and the first MDU, does not satisfy the threshold measure of performance.

11. The method of claim 9, further comprising:
  outputting information indicating that the device has connected to the first MDU, wherein a second device receives the information indicating that the device has connected to the first MDU and determines, based on the received information, routing information regarding a route that includes the device and the first MDU.

12. The method of claim 11, wherein the second device includes a third MDU that is communicatively coupled to the first MDU and the core of the wireless network.

13. The method of claim 9, comprising:
  determine a set of performance metrics associated with a route that includes the device and the first MDU;
  generating, based on the set of performance metrics, a performance score;
  broadcasting the performance score, wherein one or more MDUs:
    receive the broadcasted performance score from the device, and
    determine whether to connect to the device based on the broadcasted performance score.

14. The method of claim 9, wherein selecting the first MDU further includes:
  determining one or more performance metrics between the device and each MDU, of the plurality of MDUs, wherein selecting the first MDU out of the first plurality of MDUs is further based on the determined one or more performance metrics.

15. The method of claim 9, wherein receiving the traffic to be sent to the core of the wireless network includes receiving the traffic, via the wireless transceiver, from a User Equipment ("UE").

16. A non-transitory computer-readable medium, storing a plurality of processor-executable instructions to:
  receive, from a first plurality of mesh distributed units ("MDUs"), via a wireless transceiver associated with the device, broadcasted information;
  select a first MDU, out of the first plurality of MDUs, based on the received broadcasted information;
  connect, via the wireless transceiver, to the first MDU;
  subsequent to connecting to the first MDU:
    receive traffic to be sent to a core of a wireless network,
    provide the traffic to the first MDU via the wireless transceiver, wherein the first MDU forwards the traffic to the core of the wireless network, and
    determine a set of performance metrics associated with a route that includes the device and the first MDU;
    determine that the set of performance metrics, associated with the route that includes the device and the first MDU, does not satisfy a threshold measure of performance; and
    based on determining that the set of performance metrics does not satisfy the threshold measure of performance:
      cause the device to disconnect from the first MDU, receive broadcasted information from a second plurality of MDUs,
select a second MDU, out of the second plurality of MDUs, based on the received information broadcasted by the second plurality of MDUs, and connect to the second MDU.

17. The non-transitory computer-readable medium of claim 16, wherein the processor-executable instructions further include processor-executable instructions to:
identify a set of candidate MDUs out of the second plurality of MDUs, wherein identifying the set of candidate MDUs comprises excluding the first MDU from the set of candidate MDUs based on determining that the set of performance metrics, associated with the route that includes the device and the first MDU, does not satisfy the threshold measure of performance.

18. The non-transitory computer-readable medium of claim 16, wherein the processor-executable further include processor-executable instructions to:
generate, based on the set of performance metrics, a performance score;
broadcast the generated performance score, wherein one or more MDUs:
receive the broadcasted performance score from the device, and
determine whether to connect to the device based on the broadcasted performance score.

19. The non-transitory computer-readable medium of claim 16, wherein the processor-executable instructions, to select the first MDU, include processor-executable instructions to:
determine one or more performance metrics between the device and each MDU, of the first plurality of MDUs, wherein selecting the first MDU out of the first plurality of MDUs is further based on the determined one or more performance metrics.

20. The non-transitory computer-readable medium of claim 16, wherein the processor-executable instructions further include processor-executable instructions to:
output information indicating that the device has connected to the first MDU, wherein a second device receives the information indicating that the device has connected to the first MDU and determines, based on the received information, routing information regarding a route that includes the device and the first MDU.

* * * * *